(12) United States Patent
Lee et al.

(10) Patent No.: US 10,752,236 B2
(45) Date of Patent: Aug. 25, 2020

(54) APPARATUS AND METHOD FOR CONTROLLING GEAR SHIFT OF HYBRID VEHICLE

(71) Applicants: Hyundai Motor Company, Seoul (KR); Kia Motors Corporation, Seoul (KR)

(72) Inventors: Seung Han Lee, Gyeonggi-do (KR); Jun Geol Song, Seoul (KR); Sung Chan Na, Seoul (KR); Yong Kak Choi, Seoul (KR); Teh Hwan Cho, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 338 days.

(21) Appl. No.: 15/832,293

(22) Filed: Dec. 5, 2017

(65) Prior Publication Data
US 2018/0186363 A1 Jul. 5, 2018

(30) Foreign Application Priority Data
Dec. 29, 2016 (KR) .......................... 10-2016-0182256

(51) Int. Cl.
*B60W 20/12* (2016.01)
*B60W 20/30* (2016.01)
(Continued)

(52) U.S. Cl.
CPC ............ *B60W 20/30* (2013.01); *B60W 10/08* (2013.01); *B60W 10/10* (2013.01); *B60W 20/12* (2016.01); *B60W 20/13* (2016.01); *B60W 30/188* (2013.01); *B60W 40/06* (2013.01); *F16H 61/08* (2013.01); *B60W 2530/10* (2013.01); *B60W 2552/15* (2020.02); *B60W 2555/40* (2020.02)

(58) Field of Classification Search
CPC ...... B60W 20/12; B60W 20/30; B60W 10/08; B60W 10/10; B60W 10/105; B60W 10/11–115; F16H 61/08
See application file for complete search history.

(56) References Cited

U.S. PATENT DOCUMENTS 6,817,964 B2 11/2004 Kayukawa et al.
8,903,578 B2 12/2014 Yamazaki et al.

FOREIGN PATENT DOCUMENTS

JP 2004-036710 A 2/2004
JP 2004-211575 A 7/2004
(Continued)

*Primary Examiner* — Erin D Bishop
(74) *Attorney, Agent, or Firm* — Mintz Levin Cohn Ferris Glovsky and Popeo, P.C.; Peter F. Corless (57) ABSTRACT

An apparatus and method for controlling gear shift of a hybrid vehicle prevent frequent gear shift by adjusting output of a driving motor or a gear shift time point of a transmission based on road condition or vehicle state while the hybrid vehicle is driven in a specific road condition or a specific vehicle state in a HEV mode. The apparatus includes a driving state detector that detects a road condition and a vehicle state and a controller that receives the road condition and the vehicle state from the driving state detector to differentiate and select a hybrid electric vehicle (HEV) mode into a normal mode and a compensation mode. The controller adjusts the output of a driving motor or a gear shift time point of a transmission according to different conditions from the driving state detector in the compensation mode.

12 Claims, 4 Drawing Sheets

(51) Int. Cl.
    *B60W 30/188*     (2012.01)
    *B60W 40/06*     (2012.01)
    *B60W 20/13*     (2016.01)
    *B60W 10/10*     (2012.01)
    *B60W 10/08*     (2006.01)
    *F16H 61/08*     (2006.01)

(56) References Cited

FOREIGN PATENT DOCUMENTS

| | | |
|---|---|---|
| JP | 2010-216626 A | 9/2010 |
| JP | 2011-011648 A | 1/2011 |
| JP | 2013-099994 A | 5/2013 |

FIG. 1

PRIOR ART

FIG. 2

PRIOR ART

FIG. 3

PRIOR ART

APPARATUS AND METHOD FOR CONTROLLING GEAR SHIFT OF HYBRID VEHICLE

CROSS-REFERENCE TO RELATED APPLICATION(S)

This application claims the benefit of Korean Patent Application No. 10-2016-0182256, filed on Dec. 29, 2016, which is hereby incorporated by reference as if fully set forth herein.

BACKGROUND

Field of the Invention

The present invention relates to an apparatus and method for controlling gear shift of a hybrid vehicle, and more particularly, to an apparatus and method for controlling gear shift of a hybrid vehicle, for preventing frequent gear shift by adjusting output of a driving motor or a gear shift time point of a transmission based on a road condition or vehicle state while the hybrid vehicle is driven in a specific road condition or a specific vehicle state in a hybrid electric vehicle (HEV) mode.

Discussion of the Related Art

Figure 1:
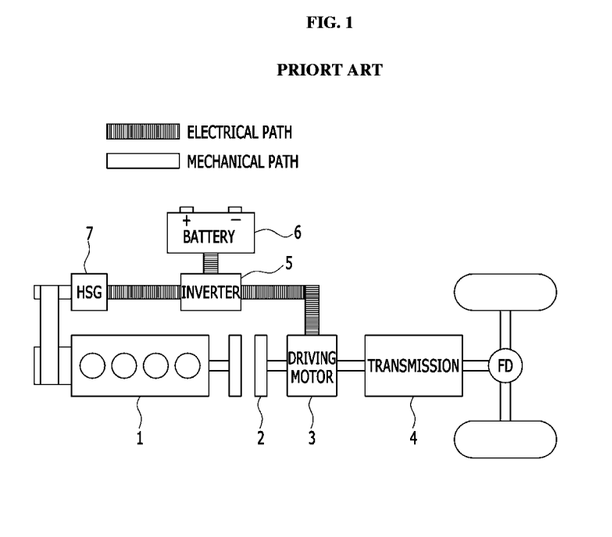
FIG. 1 is a schematic diagram illustrating a general hybrid vehicle according to the prior art.

A hybrid vehicle is an eco-friendly vehicle that uses an engine and a motor as a driving source to reduce exhaust gas and enhance fuel efficiency. As illustrated in FIG. 1 of the prior art, a hybrid vehicle typically includes an engine 1 and a driving motor 3 as a driving source for vehicle driving and also includes an engine clutch 2 interposed between the engine 1 and the driving motor 3, a transmission 4 connected to an output side of the driving motor 3, an inverter 5 that drives the driving motor 3, a battery 6 connected to the driving motor 3 to be charged and discharged using the inverter 5, as a power source of the driving motor 3, and so on.

In FIG. 1, a component denoted by reference numeral 7 refers to a hybrid starter-generator (HSG) that is connected to the engine 1 to transmit power and turns on an engine or generates electricity as engine power in a hybrid vehicle. The engine clutch 2 selectively transmits or shuts off power between the engine 1 and the driving motor 3 through a coupling or decoupling operation based on hydraulic pressure and the inverter 5 converts direct current (DC) of the battery 6 into three-phase alternating current (AC) and applies the converted current to a driving motor to drive the driving motor 3. In addition, the transmission 4 is connected to an output side of the driving motor 3, converts power of an engine and a motor, and transmits the power to a driving shaft.

The hybrid vehicle is driven in an electric vehicle (EV) mode that is a pure electric vehicle mode using power of the driving motor 3 or a hybrid electric vehicle (HEV) mode that uses both power of the engine 1 and power of the driving motor 3. In the HEV mode, according to a driver request, a driving point determined according to torque and speed of the engine and the motor is calculated according to optimum system efficiency. In other words, torque required by the driver is determined as the sum of optimum motor torque and optimum engine torque.

In a hybrid vehicle with a multistage transmission installed therein, torque intervention control for reducing charging torque (e.g., generation torque or regenerative braking torque) of a driving motor is performed during a gear shift process. In addition, in a hybrid vehicle with a multistage transmission installed therein, regenerative energy is changed through a gear and gear shift control and, in this regard, a torque absolute value (here, torque refers to motor charging torque and motor charging torque is negative torque) of a driving motor may be reduced and regenerated power may be reduced during the gear shift process. Accordingly, when consecutive and sequential speed change occurs during braking, it is disadvantageous that motor charging torque is reduced every gear shift and total regenerative power is greatly reduced.

In a conventional hybrid vehicle, when a driver intends to maintain a constant vehicle speed under a specific road condition or a specific vehicle state during vehicle driving, gear shift is frequently caused. For example, with regard to a hybrid commercial vehicle with a trailer connected thereto, which is driven on an inclined road, during low-gear driving, a gear ratio is relatively high and spare driving force is sufficient and, thus, even when an accelerator is engaged minimally, vehicle speed is increased and, on the other hand, during high-gear driving, a gear ratio is low and spare driving force is not sufficient and, thus, even when an accelerator is fully engaged, vehicle speed is reduced.

Figure 2:
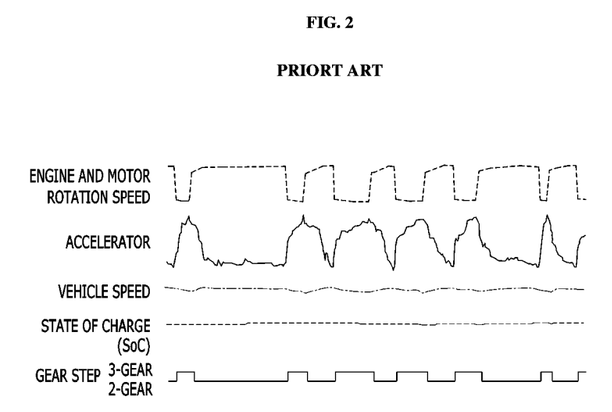
FIG. 2 is a diagram showing experimental data about a behavior in a hybrid commercial vehicle with a trailer connected thereto and driven in a low gear on an inclined road according to the prior art.

In addition, when vehicle speed is reduced and an accelerator is fully engaged, down shift back to a low gear occurs and the above phenomenon is repeated. FIG. 2 is a diagram showing experimental data about a behavior in an actual hybrid vehicle according to the prior art. As shown in FIG. 2, when a driver maintains a constant vehicle speed, the vehicle speed is increased during second-gear driving but is reduced during third-gear driving and, accordingly, it is difficult to maintain the vehicle speed, e.g., 60 km per hour and the remaining capacity of a battery hovers around a lowest value. Accordingly, a vehicle is driven while an accelerator is manipulated variably.

Figure 3:
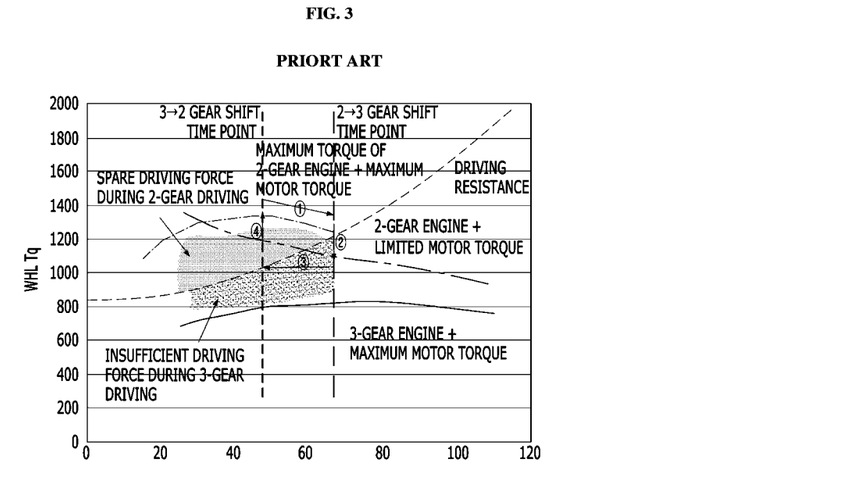
FIG. 3 is a line diagram of driving force, which shows the reason for the behavior of FIG. 2 according to the prior art.

FIG. 3 is a line diagram of driving force, which shows the reason for the above phenomenon according to the related art. As illustrated in the drawing, an accelerator needs to be released due to sufficient driving force in second gear and vehicle speed is reduced due to insufficient driving force in the third gear. Accordingly, based on a vehicle behavior, an operation according to ①→②→③→④ is repeated in the drawing.

Operation ① is a state in which a hybrid vehicle is driven in a second transmission gear, a driving motor has maximum torque, and vehicle speed is increased at higher driving force than driving resistance. In operation ②, a transmission gear is shifted to the third gear from the second gear. In operation ③, a hybrid vehicle driven in the third gear as soon as the vehicle is in the aforementioned state of ② has higher driving resistance than driving force and, thus, vehicle speed may be reduced. In operation ④, to compensate for insufficient driving force while vehicle speed is reduced, the third gear is changed back to the second gear.

The above problem according to the prior art is frequently encountered due to a specific road condition or a specific vehicle state not being considered when a hybrid vehicle having a multistep transmission is driven according to a predetermined torque map and, accordingly, a driver has an inferior driving experience and torque intervention due to frequent gear shift and degraded fuel efficiency due to clutch slip control are also caused, causing energy loss.

In addition, frequent gear shift increases temperature of components of a transmission to high temperature within a short period of time and, accordingly, the durability of components is degraded and manufacturing costs are increased due to a quality issue or increase in component capacity.

SUMMARY

Accordingly, the present invention provides an apparatus and method for controlling gear shift of a hybrid vehicle that substantially obviates one or more problems due to limitations and disadvantages of the related art. An object of the present invention is to provide an apparatus and method for controlling gear shift of a hybrid vehicle, for preventing frequent gear shift when the hybrid vehicle is driven in a specific road condition and a specific vehicle state.

Another object of the present invention is to provide an apparatus and method for controlling gear shift of a hybrid vehicle, for preventing energy loss due to frequent gear shift and recharging a battery with electric energy (remaining capacity of a battery) obtained by adjusting an output amount of a driving motor and then using the energy under other conditions, thereby obtaining higher fuel efficiency.

Another object of the present invention is to provide an apparatus and method for controlling gear shift of a hybrid vehicle, for preventing frequent manipulation of an accelerator and frequent gear shift according thereto due to the aforementioned specific road condition and vehicle state to provide a more convenient and stable driving experience to a driver. An object of the present invention is to provide an apparatus and method for controlling gear shift of a hybrid vehicle, for preventing frequent gear shift to prevent manufacturing costs from being increased due to degraded durability of a multistep transmission and to save fuel and component costs.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

According to one aspect of the present invention, an apparatus for controlling gear shift of a hybrid vehicle may include a driving state detector configured to detect a road condition and a vehicle state, and a controller configured to determine the road condition and the vehicle state from the driving state detector and to differentiate and select a hybrid electric vehicle (HEV) mode into a normal mode and a compensation mode. The controller is further configured to adjust output of a driving motor or a gear shift time point of a transmission based on different conditions from the driving state detector in the compensation mode. The driving state detector may include an inclination detector, an altitude detector, a weight detector, and a state of charge (SoC) detector.

In another aspect of the present invention, a method of controlling gear shift of a hybrid vehicle may include detecting a road condition and a vehicle state, selecting a driving mode of a vehicle from an electric vehicle (EV) mode and a hybrid electric vehicle (HEV) mode, upon selecting the HEV mode, determining the road condition and the vehicle state and selecting a mode from a normal mode and a compensation mode, and upon selecting the compensation mode, adjusting output of a driving motor or a gear shift time point of a transmission based on the road condition and the vehicle state.

The road condition may be obtained by leveling inclination of a road on which a vehicle is driven and an altitude. The vehicle state may be obtained by leveling a weight of a driving vehicle and a state of charge (SoC) of a battery. Output of the driving motor may be differentiated and adjusted for each transmission gear of the transmission. The gear shift time point of the transmission may be differentiated and adjusted for each transmission gear of the transmission.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate exemplary embodiment(s) of the invention and together with the description serve to explain the principle of the invention. In the drawings.

DETAILED DESCRIPTION OF THE INVENTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Exemplary embodiments of the present invention are described in detail so as for those of ordinary skill in the art to easily implement with reference to the accompanying drawings. However, the present invention may be implemented in various different forms and is not limited to these exemplary embodiments.

To clearly describe the present invention, a part without concerning to the description is omitted in the drawings, and like reference numerals in the specification denote like elements. Throughout this specification, the same reference numerals in the drawings denote the same element.

In the following description of the at least one exemplary embodiment, a detailed description of known functions and configurations incorporated herein will be omitted for the purpose of clarity and for brevity. The features of the present invention will be more clearly understood from the accompanying drawings and should not be limited by the accompanying drawings, and it is to be appreciated that all changes, equivalents, and substitutes that do not depart from the spirit and technical scope of the present invention are encompassed in the present invention. It will be understood that when an element is referred to as being "on", "connected to" or "coupled to" another element, it may be directly on, connected or coupled to the other element or intervening elements may be present.

All terms including technical or scientific terms have the same meanings as generally understood by a person having ordinary skill in the art to which the present invention pertains unless mentioned otherwise. Generally used terms, such as terms defined in a dictionary, should be interpreted to coincide with meanings of the related art from the context. Unless differently defined in the present invention, such terms should not be interpreted in an ideal or excessively formal manner. As necessary, even terms defined in the specification are not interpreted to exclude exemplary embodiments of the present invention.

According to the present invention, to overcome the aforementioned problem according to the prior art, a condition of a road on which a hybrid vehicle is driven and a state of the vehicle may be determined and adjustment of differentiating output of a driving motor or adjustment of differentiating a gear shift time point of the vehicle based on the condition and the state may be performed to prevent frequent gear shift. Hereinafter, an exemplary embodiment of the present invention will be described with reference to FIGS. 4 to 7.

Figure 4:
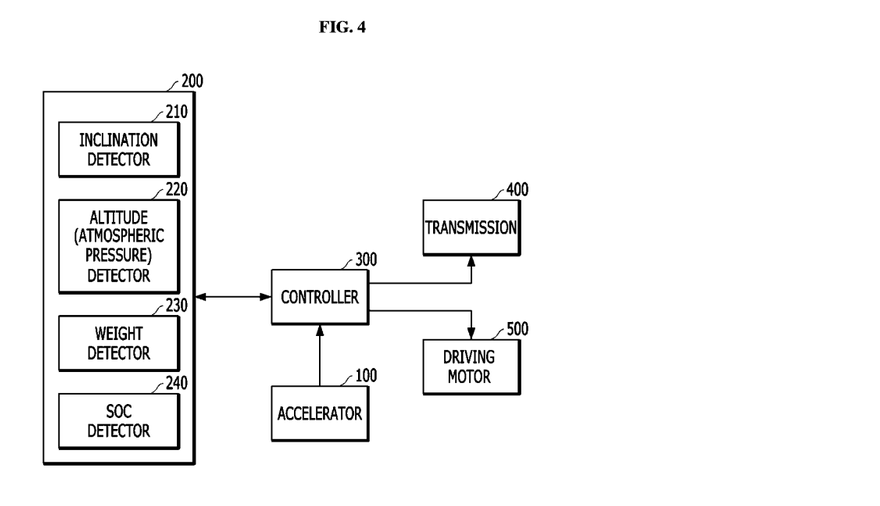
FIG. 4 is a schematic diagram illustrating an apparatus for controlling a transmission of a hybrid vehicle according to an exemplary embodiment of the present invention.

As illustrated in FIG. 4, an apparatus for controlling gear shift of a hybrid vehicle according to the present invention may include a driving state detector 200 (e.g., a sensor) configured to detect a condition of a gear-shift road and a state of the vehicle, and a controller 30 configured to receive signals of the road condition and the vehicle state from the driving state detector 200.

The driving state detector 200 may include, but is not limited to, an inclination detector 210, an altitude detector 220, a weight detector 230, and a state of charge (SoC) detector 240, wherein the various detectors are sensors mounted within the vehicle. The inclination detector 210 may be configured to detect an inclination of a road on which a vehicle is being driven. In addition, the altitude detector 220 may be configured to detect the altitude of the road on which the vehicle is being driven. The altitude detector 220 may further be configured to detect atmospheric pressure. The weight detector 230 may be configured to detect a vehicle weight and, in particular, for a commercial vehicle with a trailer connected thereto, the weight detector 230 may be configured to detect a weight of the trailer and the sum of the weights of the trailer and the vehicle.

The SoC detector 240 may be configured to detect a state of charge of a battery that drives a driving motor 500 and the detectors 210 to 240 may be configured to input detected values of a driving mode and gear shift control of the hybrid vehicle to the controller 300, which will be described below. The controller 300 may be configured to adjust output torque of an engine (not shown) and the driving motor 500 based on a state of the hybrid vehicle and drive the hybrid vehicle in an EV mode, an HEV mode, and a regenerative braking mode based on a driving condition and a state of charge (SoC) of a battery.

Although not described specially, in the specification and the claims, it would be obvious to one of ordinary skill in the art that an accelerator position detector may include a throttle valve opening degree detector of an accelerator 100 and that a positional value of the accelerator includes an opening degree of a throttle valve.

Further, the controller 300 may be configured to set target engine torque using an engine torque map based on vehicle speed and requirement torque. The requirement torque may be calculated based on a positional value of the accelerator and vehicle speed, the engine torque map stores target engine torque that corresponds to a given condition and, in general, torque that corresponds to an optimal driving point of an engine may be set to target engine torque.

Figure 5:
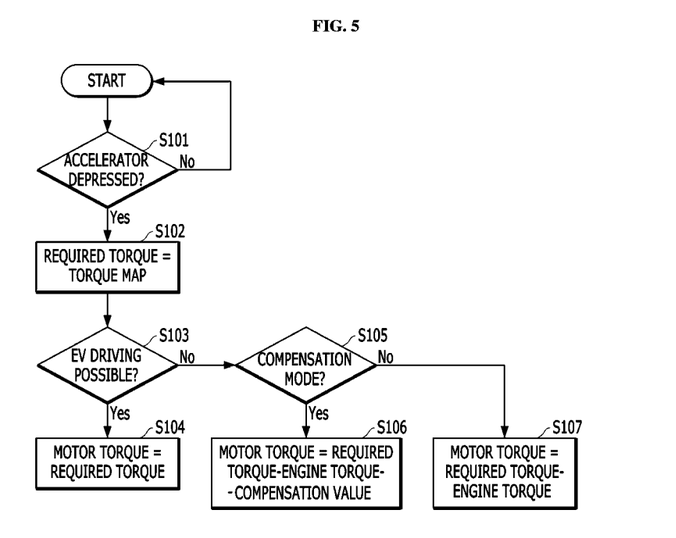
FIG. 5 is a flowchart illustrating a method of controlling gar shift of a hybrid vehicle according to an exemplary embodiment of the present invention.

Hereinafter, a method of controlling gear shift of a hybrid vehicle illustrated in FIG. 5 according to the present invention will be described. The controller 300 may be configured to receive, as an input value, a condition of a road on which a vehicle is currently driven and a state of the vehicle, which are detected by the driving state detector 200. When a driver depresses or engages the accelerator 100 (operation S101), the controller 300 may be configured to adjust engine torque based on the torque engine map based on the requirement torque of the vehicle as described above (operation S102).

In addition, according to the torque map, a driving mode of the hybrid vehicle may be selected from an EV mode in which the vehicle is driven only by a driving motor and a HEV mode in which a driving motor and an engine are used as a driving source (operation S103). When the vehicle is capable of being driven in the EV mode, the controller 300 may be configured to drive the vehicle by driving force of the driving motor 500 and, otherwise, the controller 300 may be configured to drive the vehicle in the HEV mode (operation S104).

When the vehicle enters the HEV mode, the controller 300 may be configured to determine whether the HEV mode is executed as a normal mode or a compensation mode that corresponds to the feature according to the present invention based on the condition of the road on which the vehicle is driven and the state of the vehicle, which are detected by the driving state detector 200 (operation S105). When the HEV mode is executed as a normal mode, the controller 300 may be configured to adjust torque of the driving motor 500 as output obtained by subtracting engine torque from current required torque of the vehicle, which corresponds to a general hybrid driving mode.

When the vehicle is in the aforementioned specific road condition and specific vehicle state, an HEV mode may be selected, the controller 300 may be configured to select a compensation mode, and output of the driving motor 500 or a gear shift time point of a transmission 400 may be adjusted based on the road condition and vehicle state. The controller 300 determination is based on the following road condition and vehicle state.

1. Determination Basis
① Road Condition
Input signal: Inclination of road or the altitude (or atmospheric pressure)
② Vehicle Condition
Input signal: Whether a trailer is installed (or estimated mass) or remaining capacity (SoC) of battery

TABLE 1

Application Table of Compensation Value according to Inclination of Road, Altitude, and Vehicle Weight

| | | Trailer Weight | | |
|---|---|---|---|---|
| Inclination | Altitude | Level 1 | Level 2 | Level 3 |
| Level 1 | High Land | Off | Off | On |
| | Low Land | Off | Off | On |
| Level 2 | High Land | Off | On | On |
| | Low Land | Off | Off | On |
| Level 3 | High Land | On | On | On |
| | Low Land | Off | On | On |

As shown in Table 1 above, a road condition may be obtained by leveling inclination of a road on which a vehicle is driven and an altitude. For example, when a hybrid vehicle is connected to a trailer with a weight of Level 2 and is driven on a road with inclination of Level 2 positioned on high land (e.g., an inclined road surface), the controller 300 may be configured to determine that the vehicle enters a compensation mode but, when other conditions are the same as the above case and the vehicle is positioned on a road positioned on low land (e.g., a substantially flat road surface), the vehicle may be driven in a normal mode instead of a compensation mode.

The weight range may be classified into level 1 to level 3, and the weight detector 230 may be configured to detect the sum of the weights of the trailer and the vehicle.

For example, Level 1 may be equal to or less than the sum of one-third of the maximum possible weight of the trailer and the maximum weight of the vehicle. The maximum possible trailer weight may mean the maximum allowable value of the trailer that can be connected to the vehicle. Level 2 may be equal to or less than the sum of two-third of the maximum possible weight of the trailer and the maximum weight of the vehicle. Level 3 may be greater than the sum of two-third of the maximum possible weight of the trailer and the maximum weight of the vehicle. Assuming that the maximum weight of the vehicle is 2000 kg and the maximum possible weight of the trailer is 900 kg, the level 1 may be 2300 kg or less, the level 2 may be 2600 kg or less, and the level 3 may be 2600 kg or more. However, it is apparent to persons skilled in the art that the above-mentioned weight range is exemplary and the specific weight range is not limited thereto. And weight range may include a calculation error depending on the engine performance.

TABLE 2

Application Table of Compensation Value according to Remaining Capacity (SoC) of Battery

| | Trailer Weight | | |
|---|---|---|---|
| SoC | LEVEL 1 | LEVEL 2 | LEVEL 3 |
| HIGH | OFF | OFF | OFF |
| MID | OFF | OFF | ON |
| LOW | ON | ON | ON |

As shown in Table 2 above, even when a trailer has a weight of Level 2, the remaining capacity of the battery is low, the vehicle enters a compensation mode but, when the remaining capacity of the battery is high, the vehicle may be driven in a normal mode.

For example, the HIGH level of SoC has a discharge-oriented tendency, and the remaining capacity of the battery may be more than 75%. If the remaining capacity of battery is higher than the HIGH level of SoC, the efficiency of the battery may deteriorate. The MID level of SoC has a maintenance-oriented tendency, and the remaining capacity of the battery may be 30% to 75%. The LOW level of SoC has a charge-oriented tendency, and the remaining capacity of the battery may be less than 30%. If the remaining capacity of battery is lower than the LOW level of SoC, the output of battery and the output performance of the motor may deteriorate.

2. Differentiated Controlling Method in Compensation Mode
① Differentiation of Motor Output
Determination Signal: Motor Output and Gear Step In other words, as shown in Table 3 below, output of a driving motor may be differentiated and adjusted for each transmission gear of the transmission 400.

TABLE 3

Control Table of Output Value for each Transmission Gear

| Transmission Gear | $1^{ST}$ | $2^{ND}$ | $3^{RD}$ | $4^{TH}$ | $5^{TH}$ | $6^{TH}$ |
|---|---|---|---|---|---|---|
| OFF | 32 kW | 32 kW | 32 kW | 32 kW | 32 kW | 32 kW |
| ON | 30 kW | 27 kW | 28 kW | 29 kW | 32 kW | 32 kW |

In other words, according to the present invention, in a specific road condition or a specific vehicle state, even when a driver maintains an opening degree of an accelerator by reducing output of a driving motor compared with normal hybrid driving, required torque may be reduced and vehicle speed is maintained.

② Differentiation of Gear Shift Time Point

Determination Signal: Inclination and Transmission Gear

As shown in Table 4 below, a gear shift time point of a transmission gear may be adjusted to be differentiated according to road inclination to have the same advantage.

TABLE 4

Control Table of Gear Shift Time Point of Transmission Gear for Road Inclination

| Gear Step | 1→2 | 2→3 | 3→4 | 4→5 | 5→6 |
|---|---|---|---|---|---|
| OFF | 36.4 | 66.0 | 112.0 | 165.3 | 210.0 |
| ON | 38.3 | 67.1 | 114.0 | 165.3 | 210.0 |

As described above, when output of a driving motor or a gear shift time point is adjusted under a specific road condition or a specific vehicle state through a compensation mode, even when driving force is reduced in a low gear and a driver arbitrarily manipulates an accelerator, the increase in vehicle speed is not high (e.g., minimal vehicle speed increase). Accordingly, gear shift to a high gear may be difficult to perform and, thus, the driver may operate the vehicle at a highest speed in which the hybrid vehicle is driven in as low a gear as possible. A gear shift may be delayed by as much as insufficient output to prevent frequent gear shift.

Figure 6:
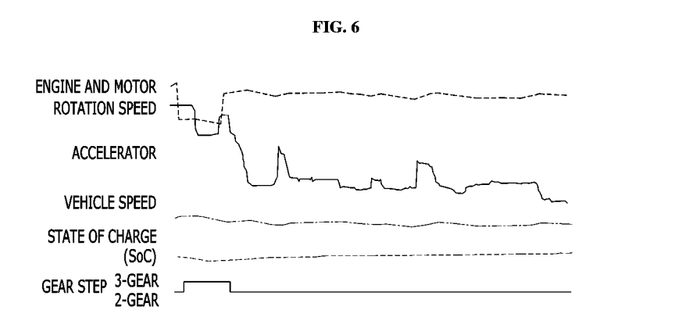
FIG. 6 is a diagram illustrating enhancement in performance for gear shift when an apparatus and method for controlling gear shift of a hybrid vehicle is used according to an exemplary embodiment of the present invention.

Referring to FIG. 6 showing enhancement according to the present invention, when an initial state of a compensation mode with a compensation value applied thereto is passed, even when an opening degree of an accelerator is changed, vehicle speed may be maintained at a substantially constant level, a battery amount may be increased continuously, and a gear may be maintained continuously in second gear.

Figure 7:
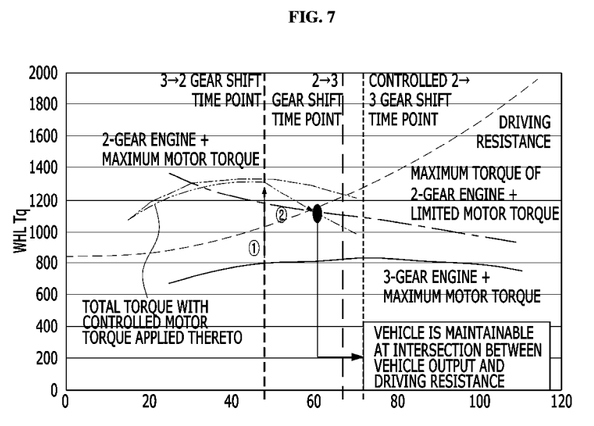
FIG. 7 is a line diagram of driving force, for explanation of enhancement in performance illustrated in FIG. 6 according to an exemplary embodiment of the present invention.

Referring to FIG. 7 showing a line diagram of driving force of a vehicle using a controlling apparatus and method according to the present invention, output of a driving motor may be adjusted and a gear shift time point may be adjusted to a third transmission gear from a second transmission gear and, accordingly, vehicle speed may be maintained at constant speed, for example, about 60 km per hour at intersection between vehicle output and driving resistance.

As described above, according to the apparatus and method for controlling gear shift according to the present invention, control may be performed to differentiate output of a driving motor or to differentiate a gear shift time point of the vehicle to prevent frequent gear shift while a hybrid vehicle is driven under a specific road condition and a specific vehicle state, thereby preventing energy loss due to frequent gear shift.

A battery may be recharged with electric energy obtained by adjusting an output amount of a driving motor and used under other driving conditions, thereby obtaining higher fuel efficiency. During driving under a specific road condition and vehicle state, frequent manipulation of an accelerator and frequent gear shift according thereto may be prevented to provide more convenient and stable driving experience to a driver.

It will be appreciated by persons skilled in the art that that the effects that could be achieved with the present invention are not limited to what has been particularly described hereinabove and other advantages of the present invention will be more clearly understood from the above detailed description. It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An apparatus for controlling gear shift of a hybrid vehicle including a driving motor, a transmission, and a battery, comprising:
   a detector including a plurality of sensors configured to detect a road condition and a vehicle state; and
   a controller configured to receive the road condition and the vehicle state from the detector and to select a driving mode of the hybrid vehicle from an electric vehicle (EV) mode and a hybrid electric vehicle (HEV) mode,
   wherein the controller is configured to determine whether the HEV mode is executed as a normal mode or a compensation mode based on the road condition and the vehicle state when the driving mode is selected as the HEV mode,
   wherein the controller is configured to adjust output of the driving motor or a gear shift time point of the transmission in the compensation mode, and
   wherein the gear shift time point of the transmission is differentiated and adjusted for each transmission gear of the transmission.

2. The apparatus according to claim 1, wherein the the plurality of sensors include an inclination detector, an altitude detector, a weight detector, and a state of charge (SoC) detector.

3. The apparatus according to claim 2, wherein the road condition is obtained by classifying each of an inclination and an altitude of a road on which the hybrid vehicle is driven to predetermined levels.

4. The apparatus according to claim 2, wherein the vehicle state is obtained by classifying each of a weight and a state of charge (SoC) of the battery of the hybrid vehicle to predetermined levels.

5. The apparatus according to claim 2, wherein output of the driving motor is differentiated and adjusted for each transmission gear of the transmission.

6. The apparatus according to claim 1, wherein the road condition is obtained by classifying each of an inclination and an altitude of a road on which the hybrid vehicle is driven to predetermined levels.

7. The apparatus according to claim 1, wherein the vehicle state is obtained by classifying each of a weight and a state of charge (SoC) of the hybrid driving vehicle to predetermined levels.

8. The apparatus according to claim 1, wherein output of the driving motor is differentiated and adjusted for each transmission gear of the transmission.

9. A method of controlling gear shift of a hybrid vehicle including a driving motor, a transmission, and a battery, comprising:
- detecting, by a controller, a road condition and a vehicle state;
- selecting, by the controller, a driving mode of the hybrid vehicle from an electric vehicle (EV) mode and a hybrid electric vehicle (HEV) mode;
- determining, by the controller, whether the HEV mode is executed as a normal mode or a compensation mode based on the road condition and the vehicle state when the driving mode is selected as the HEV mode; and
- adjusting, by the controller, output of the driving motor or a gear shift time point of the transmission in the compensation mode,
- wherein the gear shift time point of the transmission is differentiated and adjusted for each transmission gear of the transmission.

10. The method according to claim 9, wherein the road condition is obtained by classifying each of an inclination and an altitude of a road on which the hybrid vehicle to predetermined levels.

11. The method according to claim 9, wherein the vehicle state is obtained by classifying each of a weight and a state of charge (SoC) of the battery of the hybrid vehicle to predetermined levels.

12. The method according to claim 9, wherein output of the driving motor is differentiated and adjusted for each transmission gear of the transmission.

* * * * *